United States Patent Office 3,524,832
Patented Aug. 18, 1970

3,524,832
POLYOXYMETHYLENE CONTAINING ALKYLATED DIPHENYL AMINE AND CYANOGUANIDINE AS STABILIZERS
Richard Green, Livingston, N.J., assignor to Tenneco Chemicals, Inc., a corporation of Delaware
No Drawing. Filed Nov. 4, 1966, Ser. No. 591,970
Int. Cl. C08g 41/04, 51/60
U.S. Cl. 260—45.9                      5 Claims

ABSTRACT OF THE DISCLOSURE

Formaldehyde polymer compositions that contain as stabilizer an alkyldiphenylamine and a nitrogen-containing compound, such as a superpolyamide or cyanoguanidine, are characterized by excellent thermal stability, oxidative stability, color, and color retention.

---

This invention relates to stabilized polyacetal resin compositions. More particularly, it relates to formaldehyde polymer compositions that have excellent thermal stability, oxidative stability, and other valuable properties.

High molecular weight formaldehyde polymers are thermoplastic resins that may be fabricated into films, filaments, fibers, rods, tubes, and the like. These polymers may be prepared by the polymerization of monomeric formaldehyde or trioxane alone or in the presence of one or more copolymerizable compounds using polymerization procedures that are well known in the art. While formaldehyde polymers prepared by some methods are far more stable than those prepared by others, it is desirable for most uses that the thermal and oxidative stability of these polymers be improved.

In accordance with this invention, it has been found that the stability of high molecular weight formaldehyde polymer compositions can be substantially improved by incorporating in the compositions a stabilizer system comprising an alkyldiphenylamine and a nitrogen-containing compound as hereinafter defined. In addition to imparting increased resistance to degradation caused by heat and by oxidation to the polyacetal compositions, the use of these stabilizer systems results in the formation of stabilized compositions that are white or off-white in color and that do not discolor or darken on prolonged storage.

The stabilizer systems of this invention can be used to stabilize any polyacetal composition that contains a high molecular weight formaldehyde polymer. As used herein, the term "high molecular weight formaldehyde polymer" includes linear, branched-chain, and cross-linked homopolymers, copolymers, and terpolymers having molecular weights in the range of about 10,000 to 200,000 and melting points above 150° C., the predominant structural feature of these polymers being the recurring oxymethylene units in the polymer chain. Illustrative of the useful homopolymers are polyoxymethylene polyacetates, polyoxymethylene polypropionates, and polyoxymethylene ethers, such as the methyl, ethyl, and β-hydroxyethyl ethers. The formaldehyde copolymers include linear, branched-chain, and cross-linked polymers in which the oxymethylene units in the polymer chain are interspersed with about 1 percent to 5 percent by weight of oxyalkylene units containing two or more vicinal carbon atoms or units derived from other copolymerizable compounds, such as γ-butyrolactone, acrylonitrile, acrylamide, phthalide, trithiane, or isocyanic acid. The formaldehyde polymers also include linear, branched-chain, and cross-linked terpolymers. A preferred group of terpolymers includes the products obtained by polymerizing trioxane with a monocyclic ether, such as ethylene oxide or 1,3-dioxolane, and a dicyclic ether, such as pentaerythritol diformal, butadiene dioxide, or vinyl cyclohexene dioxide. Particularly satisfactory results have been obtained using a terpolymer formed by polymerizing trioxane with 1,3-dioxolane and glyoxal bis-(ethylene glycol acetal) or methylene-bis-(4-oxymethyl-1,3-dioxolane). These terpolymers generally contain recurring oxymethylene units, about 0.1 percent to 15 percent of recurring oxyethylene units, and about 0.05 percent to 4 percent of units derived from the dicyclic ether. The formaldehyde copolymers and terpolymers are generally stabilized by degrading their molecules by heating, by hydrolysis, or by other known techniques to the point where a stable unit exists at each end. Among the formaldehyde copolymers and terpolymers that may be stabilized in accordance with this invention are those described and claimed in copending patent applications Ser. No. 293,844, now Pat. No. 3,300,445 and Ser. No. 293,845, now Pat. No. 3,293,218 which were filed on July 9, 1963 by Henri Sidi; Ser. No. 291,154, now abandoned, which was filed on July 10, 1963 by Roy T. Gottesman and Richard E. Reynolds; Ser. No. 294,178, now Pat. No. 3,293,219, which was filed on July 10, 1963 by Roy T. Gottesman, Henri Sidi, and Robert H. Barth; Ser. No. 389,196, now Pat. No. 3,372,146, which was filed on Aug. 12, 1964 by Henri Sidi; and Ser. No. 392,899, now Pat. No. 3,384,620, which was filed on Aug. 28, 1964 by Henri Sidi.

The alkyldiphenylamines that are used in the stabilizer systems of this invention have the structural formula:

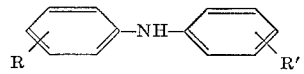

wherein R represents an alkyl group having from 4 to 10 carbon atoms and R' represents either hydrogen or an alkyl group having from 4 to 10 carbon atoms. The preferred compounds for use as stabilizers in polyacetal resin compositions are those in which R represents an octyl group and R' represents hydrogen or an octyl group. As used herein, the term "octyl" refers to aliphatic groups having the formula $C_8H_{17}$ and includes both straight-chain and branched-chain alkyl groups, including, for example, n-octyl, isooctyl, tertiary octyl, 2-ethylhexyl, 2,4,4-trimethylpentyl, and 3,4-dimethylhexyl groups.

The alkyldiphenylamines may be prepared by any suitable and convenient procedure. For example, they may be prepared by the alkylation of diphenylamine with the appropriate alcohol, alkyl halide, aliphatic carbonyl compound, or olefin. Particularly satisfactory results have been obtained by alkylating diphenylamine with olefins containing 4 to 10 carbon atoms, such as butenes, heptenes, octenes, and nonenes, in the presence of an acidic alkylation catalyst, such as aluminum chloride or boron trifluoride, and a scavenger for unreacted diphenylamine, such as styrene. The resulting alkyldiphenylamines, which are usually mixtures of monoalkyl and dialkyl diphenylamines, can be used without further purification in the stabilizer systems of this invention. The preparation of alkyldiphenylamines is well known in the art and is described in detail, for example, in U.S. Pat. 2,943,112. Either a mixture of mono- and di-alkyldiphenylamines or the individual compounds may be used in the practice of this invention.

While the alkyldiphenylamines can be used as the sole stabilizer in formaldehyde polymer composition far better stabilization is obtained when these compounds are used in combination with a nitrogen-containing compound, such as a superpolyamide or an amidine compound. It has been found that nitrogen-containing compounds of either of these types will enhance the effectiveness of alkyldiphenylamines in compositions containing any formaldehyde homopolymers, copolymers, or terpolymers as hereinbefore defined. Particularly satisfactory results have been obtained when the nitrogen-containing compound in the stabilizer system of an acetylated or ether-capped formaldehyde homopolymer composition was a superpolyamide and when the nitrogen-containing compound in the stabilizer system of a formaldehyde copolymer or terpolymer composition was an amidine compound.

The superpolyamides that may be present in the stabilizer systems of this invention are those that are formed by the condensation of dicarboxylic acids with diamines or by the polymerization of ω-aminomonocarboxylic acids. These superpolyamides have a degree of polymerization in the range of about 100 to 200, and they preferably have melting points below about 220° C. Among the superpolyamides that may be used in the stabilizer systems to stabilize high molecular weight formaldehyde polymers in accordance with this invention are the condensation products of the following diamines and dicarboxylic acids: pentamethylenediamine/malonic acid, pentamethylenediamine/pimelic acid, hexamethylenediamine/adipic acid, hexamethylenediamine/sebacic acid, N,N' - hydroxymethylhexamethylenediamine/adipic acid, N,N'-methoxymethylhexamethylenediamine/adipic acid, octamethylenediamine/suberic acid, 1,1,6,6-tetramethylenehexamethylenediamine/sebacic acid, decamethylenediamine/sebacic acid, dodecanemethylenediamine/2,2,5,5-tetramethyladipic acid, and 2,5-dimethylpiperazine/glutaric acid. Alternatively, the stabilizer system may contain superpolyamides which are the products obtained by polymerizing an ω-aminomonocarboxylic acid, such as 6-aminocaproic acid, 9-aminomonanoic acid, 11-aminoundecanoic acid, or its lactomer superpolyamides which are copolymers or terpolymers.

A wide variety of amidine compounds can be used in the stabilizer systems of this invention. These include cyanoguanidine and substituted cyanoguanidines in which the substituents are alkyl, phenyl, hydroxymethyl, chloromethyl, and chlorophenyl groups, for example, 1-cyano-3-methylguanidine, 1-cyano-3-dodecyl guanidine, 1-cyano-3,3-diphenylguanidine, 1-cyano-3-hydroxymethyl guanidine, 1-cyano-3-(m-chlorophenyl) guanidine, and 1-cyano-3-(chloromethyl) guanidine. Another group of useful amidine compounds are the polyaminotriazoles, which are obtained by heating a dihydrazide of a dicarboxylic acid having from 8 to 14 carbon atoms, such as sebacic acid, azelaic acid, suberic acid, adipic acid, decanedioic acid, undecanedioic acid, isophthalic acid, phenylene diacetic acid, and norpinic acid with aqueous hydrazine hydrate, and which have structural units of the formula:

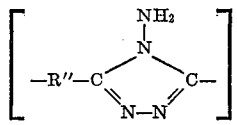

wherein R" represents a divalent organic radical that is the residue of one of the aforementioned dicarboxylic acids. Amino-substituted s-triazines constitute another useful class of amidine compounds. Illustrative of these compounds are 2,4-diamino-6- phenyltriazine, 2,4-diamino-6-methyltriazine, 2,4-diamino-6-chlorotriazine, 2,4-diamino-6-mercaptotriazine, 2,4-dihydroxy-6-aminotriazine, 2,4,6-triaminotriazine (melamine), phenylmelamine, N,N-dialkylmelamine, N,N-diphenylmelamine, and the like. Compounds with an amidazoline nucleus constitute still another suitable class of amidine compounds. These compounds have the formula

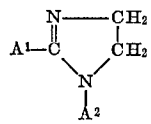

wherein $A^1$ and $A^2$ are monofunctional radicals. An especially useful class of compounds are those in which $A^1$ is a long chain aliphatic hydrocarbon group, such as an alkyl group, a monoolefinic group, or a diolefinic group and $A^2$ is a short chain radical, such as 2-aminoethyl or 2-hydroxyethyl.

The amounts of the alkyldiphenylamine and the nitrogen-containing compound that are used in the stabilized polyacetal compositions may be varied over a wide range. In most cases, the stabilized polyacetal compositions contain about 0.1 percent to 5 percent by weight, based on the weight of the formaldehyde polymer, of alkyldiphenylamine and about 0.01 percent to 20 percent by weight, based on the weight of the formaldehyde polymer, of the nitrogen-containing compound. It is generally preferred that the compositions contain as stabilizer 0.2 percent to 3 percent by weight of alkyldiphenylamine and 0.05 percent to 3 percent by weight of the nitrogen-containing compound, based on the weight of the formaldehyde polymer.

Although the optimum concentration ranges which are described above for the alkyldiphenylamine and nitrogen-containing compound have been found to be effective in improving the thermal and oxidative stability of those high molecular weight polymers of formaldehyde which were tested, it should be realized that the actual amount of each component used in the stabilizer system is dependent to a large extent upon the structure and chemical composition of the formaldehyde polymer. For example, if the formaldehyde polymer has been chemically stabilized, such as by acetylation, etherification, or cross-linking to block the terminal hydroxyl groups, a lower concentration of the stabilizer system may be used. Notwithstanding the degree of chemical stabilization in the formaldehyde polymer, however, it is possible to improve the stability of the polyacetal resin compositions by using these stabilizer systems, that is, systems that contain at least one each of the aforementioned alkyldiphenylamine and nitrogen-containing compounds.

Accordingly, the invention provides an improved thermally stable polyacetal resin composition comprising a high molecular weight polymer of formaldehyde including formaldehyde homopolymers, copolymers, and terpolymers and a stabilizer system comprising (a) about 0.1 percent to 5 percent by weight, based on the weight of the formaldehyde polymer, of an alkyldiphenylamine having one or two alkyl groups each of which contains from 4 to 10 carbon atoms or a mixture of said alkyldiphenylamines and (b) about 0.01 percent to 20 percent by weight, based on the weight of the formaldehyde polymer, of a nitrogen-containing compound selected from the group consisting of (1) superpolyamides formed by the polymerization of ω-aminomonocarboxylic acids, (2) superpolyamides formed by the condensation of dicarboxylic acids with diamines, (3) cyanoguanidine, (4) substituted cyanoguanidines wherein the substituent is lower alkyl, phenyl, hydroxymethyl, chloromethyl, or chlorophenyl, (5) polyaminotriazoles, (6) amino-substituted s-triazines, (7) imidazolines, and (8) mixtures thereof.

The stabilizers may be incorporated into the polyacetal resin compositions of this invention by any convenient procedure. For example, the stabilizer components may be dissolved in a volatile solvent, such as a ketone, lower alkanol, or chlorinated hydrocarbon, the resulting solution (or solutions of the individual components) added to the formaldehyde polymer in an amount that is sufficient to provide the desired amounts of the stabilizer components in the polyacetal resin composition, and the resulting mixture heated to remove the solvent by evaporation. Alternatively, the stabilized compositions can be prepared by milling the stabilizer components together with the formaldehyde polymer or by dissolving the stabilizer components and the formaldehyde polymer in a common solvent and removing the solvent by evaporation.

This invention is further illustrated by the examples that follow. In these examples all percentages are percentages by weight unless otherwise specified.

EXAMPLE 1

To samples of polyoxymethylene polyacetate that had a molecular weight of about 24,000 were added 1 percent solutions in acetone of various stabilizers. The resulting polyacetal resin compositions were air-dried to remove the acetone. The heat stability ratings of the compositions were determined by measuring the weight loss that each underwent on being heated at 222° C. in air for 30 minutes. The results of these tests are summarized in Table I. The stabilized polyacetal resin compositions were stored at room temperature for 3 months. At the end of this time, the composition that contained the stabilizer system of this invention, that is, Ex. No. 1A, was still white, whereas those containing the comparative stabilizer systems had darkened somewhat.

TABLE I

| Ex. No. | Stabilizer system | Percent weight loss | Color after exposure |
|---|---|---|---|
| 1A | 1% octylated diphenylamine,[1] 1% superpolyamide.[2] | 1.19 | White. |
| 1B | 1% octylated diphenylamine [1] | 3.13 | Off-white. |
| 1C | 2% octylated diphenylamine [1] | 2.56 | Do. |
| 1D | 1% 2,2'-methylene bis (4-methyl-6-tert. butylphenol). | 2.69 | Buff. |
| 1E | None | 12.9 | Tan. |

[1] A mixture of monooctyl- and dioctylphenylamines melting at 96°–99° C.
[2] Terpolymer of about 38% caprolactam/35% polyhexamethylene adipamide/27% polyhexamethylene sebacamide.

EXAMPLE 2

Samples of formaldehyde polymers were blended at room temperature with stabilizers. The resulting mixtures were then masticated for varying periods of time at 220° C. in a Brabender Plastograph. The effect of this treatment on the heat stability ratings of the stabilized polymer compositions is summarized in Table II.

TABLE II

| Ex. No. | Formaldehyde Polymer | Stabilizer System | Percent weight loss after indicated number of minutes in Brabender Plastograph | | | | | Color after mastication |
|---|---|---|---|---|---|---|---|---|
| | | | 2.5 | 5 | 10 | 20 | 30 | |
| 2A | Homopolymers[1] | 0.5% superpolyamide,[3] 0.5% Dioctyldiphenylamine. | 0.83 | 0.83 | 0.84 | 0.71 | 0.81 | White. |
| 2B | do[1] | 0.5% Superpolyamide[3], 0.5% 2,2' methylene bis (4-methyl-6-tert. butylphenol). | 0.81 | 0.84 | 0.86 | 0.89 | 0.89 | Buff. |
| 2C | Terpolymer[2] | 0.2% cyanoguanidine, 0.5% dioctyldiphenylamine. | 0.76 | 0.65 | 0.62 | 0.62 | 0.59 | White. |
| 2D | do[2] | 0.2% cyanoguanidine, 0.5% 2,2' methylene bis (4-methyl-6-tert. butylphenol). | 0.78 | 0.90 | 0.74 | 0.75 | 0.89 | Buff. |
| 2E | do[2] | None | 39.4 | 39.5 | 44.6 | 38.8 | 37.7 | Tan. |

[1] Poloxymethylene polyacetate; Molecular weight, 24,000.
[2] Terpolymer containing oxymethylene units, 2.3% of oxyethylene units, and 0.07% of units derived from glyoxal bis (ethylene glycol acetal) which have the structure —O—CH$_2$—CH$_2$—O—CH—CH—O—CH$_2$—CH$_2$—O—; molecular weight, 52,000 after hydrolytic stabilization.
[3] Terpolymer of about 38% caprolactam/35% of polyhexamethylene adipamide/27% polyhexamethylene sebacamide.

EXAMPLE 3

Samples of the formaldehyde terpolymer described in Table II were blended with various stabilizer systems and then masticated for 30 minutes at 200° C. in a Brabender Plastograph. The stabilizer systems used and the heat stability ratings of the resulting stabilized compositions are set forth in Table III.

TABLE III

| Ex. No. | Stabilizer | Percent weight loss | Color after exposure |
|---|---|---|---|
| 3A | 1% dioctyldiphenylamine | 1.29 | Offwhite. |
| 3B | 1% dioctyldiphenylamine, 0.7% cyanoguanidine. | 0.26 | White. |
| 3C | 1% 2,2'-methylene bis (4-methyl-6-tert. butylphenol). | 1.55 | Buff. |
| 3D | 1% 2,2'-methylene bis (4-methyl-6-tert. butylphenol), 0.7% dicyandiamide. | 0.70 | Light buff. |
| 3E | None | 27.45 | Tan. |

EXAMPLE 4

(A) Samples of the formaldehyde terpolymer described in Table II were blended with either 0.5% of dioctyldiphenylamine and 0.2% of cyanoguanidine (Ex. No. 4A) or 0.5% 2,2'-methylene bis (4-methyl-6-tert. butylphenol) and 0.2% of cyanoguanidine (Ex. No. 4B). The samples were masticated at 200° C. for 5 minutes in a Brabender Plastigraph and then formed into pellets. The pellets containing the stabilizer system of this invention (Ex. No. 4A) lost 0.33% of their weight on heating in air at 222° C. for 30 minutes, whereas those containing a comparative stabilizer system (Ex. No. 4B) lost 0.62% of their weight in this test. After an additional mastication at 220° C. for 30 minutes, the composition of this invention lost 0.19% of its weight in the heat stability test, whereas the comparative composition lost 0.37% of its weight.

(B) The stabilized polyacetal compositions were injection molded into tensile bars, which were then heated at 135° C. in a circulating air oven for various periods of time. The properties of the bars after heating were as follows:

TABLE IV

| Ex. No. | 4A | 4B |
|---|---|---|
| Initial: | | |
| Tensile | 9,350 | 9,000 |
| Percent elongation | 23 | 11 |
| 2 weeks: | | |
| Weight loss (percent) | 0.40 | 0.66 |
| Tensile | 9,000 | 9,350 |
| Percent elongation | 13 | 16 |
| weeks: | | |
| Weight loss (percent) | 0.66 | 0.98 |
| Tensile | 9,000 | 9,200 |
| Percent elongation | 9 | 14 |
| 6 weeks: | | |
| Weight loss (percent) | 0.83 | 1.35 |
| Tensile | 9,300 | 9,100 |
| Percent elongation | 12 | 8 |

(C) Another set of the injection molded tensile bars was exposed to steam at 35 p.s.i. (120°–130° C.) for various periods of time. The properties of the bars after steam exposure were as follows:

TABLE V

| Ex. No. | 5A | 5B |
|---|---|---|
| Initial: | | |
| Tensile | 9,300 | 9,000 |
| Percent elongation | 23 | 11 |
| 24 hours: | | |
| Weight change (percent) | +2.03 | +1.93 |
| Tensile | 8,300 | 8,250 |
| Percent elongation | 34 | 46 |
| 48 hours: | | |
| Weight change (percent) | +1.82 | +1.66 |
| Tensile | 8,300 | 8,250 |
| Percent elongation | 23 | 33 |
| 72 hours: | | |
| Weight change (percent) | +1.54 | +0.89 |
| Tensile | 7,900 | 8,200 |
| Percent elongation | 12 | 16 |
| 96 hours: | | |
| Weight change (percent) | +0.85 | +0.89 |
| Tensile | 4,150 | 3,100 |
| Percent elongation | 1 | 1 |

What is claimed is:

1. A stabilized polyacetal resin composition comprising a high molecular weight formaldehyde polymer and a stabilizer system comprising (a) about 0.1 percent to 5 percent by weight, based on the weight of the formaldehyde polymer, of an alkyldiphenylamine having the structural formula

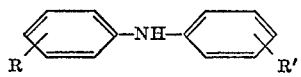

wherein R represents an alkyl group having from 4 to 10 carbon atoms and R' represents hydrogen or an alkyl group having from 4 to 10 carbon atoms and (b) about 0.01 percent to 20 percent by weight, based on the weight of the formaldehyde polymer, of cyanoguanidine.

2. A stabilized polyacetal resin as set forth in claim 1 wherein the stabilizer system contains 0.5 percent to 3 percent by weight, based on the weight of the formaldehyde polymer, of said alkyldiphenylamine and 0.05 percent to 3 percent, based on the weight of the formaldehyde polymer, of cyanoguanidine.

3. A stabilized polyacetal resin as set forth in claim 1 wherein the alkyldiphenylamine is octylated diphenylamine.

4. A stabilized polyacetal resin as set forth in claim 1 wherein the alkyldiphenylamine is dioctyldiphenylamine.

5. A stabilized polyacetal resin as set forth in claim 1 wherein the formaldehyde polymer is a terpolymer containing oxymethylene units, 0.2 percent to 3 percent of oxyethylene units, and 0.05 percent to 4 percent of units derived from glyoxal bis(ethyleneglycol acetal).

References Cited

UNITED STATES PATENTS

| | | | |
|---|---|---|---|
| 2,993,025 | 7/1961 | Alsup | 260—857 |
| 3,204,012 | 8/1965 | Eguchi | 260—857 |
| 3,235,624 | 2/1966 | Green | 260—857 |
| 3,288,885 | 11/1966 | Green et al. | 260—857 |
| 2,920,059 | 1/1960 | MacDonald | 260—45.9 |
| 2,943,112 | 6/1960 | Popoff | 260—801 |
| 3,087,911 | 4/1963 | Ainsworth | 260—45.9 |
| 3,313,767 | 4/1967 | Berardinelli | 260—45.9 |
| 3,397,170 | 8/1968 | Fourcade | 260—45.9 |

FOREIGN PATENTS 1,009,883  11/1965  Great Britain.

PAUL LIEBERMAN, Primary Examiner

U.S. Cl. X.R.

260—45.9, 67, 857, 78, 458

In addition to the alkyldiphenylamine and nitrogen-containing compound, the stabilized polyacetal compositions of this invention may also contain other stabilizers, pigments, dyes, fillers, plasticizers, and other additives that are ordinarily employed in polyacetal resin compositions.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.